US012072754B2

(12) United States Patent
Branover et al.

(10) Patent No.: US 12,072,754 B2
(45) Date of Patent: Aug. 27, 2024

(54) METHOD AND APPARATUS FOR MANAGING A CONTROLLER IN A POWER DOWN STATE

(71) Applicant: Advanced Micro Devices, Inc., Santa Clara, CA (US)

(72) Inventors: Alexander J. Branover, Boxborough, MA (US); Christopher T. Weaver, Boxborough, MA (US); Indrani Paul, Austin, TX (US); Benjamin Tsien, Santa Clara, CA (US); Mihir Shaileshbhai Doctor, Santa Clara, CA (US); Stephen V. Kosonocky, Fort Collins, CO (US); John P. Petry, San Diego, CA (US); Thomas J. Gibney, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/485,199

(22) Filed: Sep. 24, 2021

(65) Prior Publication Data
US 2023/0099399 A1   Mar. 30, 2023

(51) Int. Cl.
*G06F 1/00* (2006.01)
*G06F 1/3296* (2019.01)

(52) U.S. Cl.
CPC .................. *G06F 1/3296* (2013.01)

(58) Field of Classification Search
CPC ...................................................... G06F 1/3296
See application file for complete search history.

(56) References Cited

U.S. PATENT DOCUMENTS

| | | | | |
|---|---|---|---|---|
| 7,684,835 B1 * | 3/2010 | Vu | ...................... | H04W 52/0229 455/574 |
| 10,615,977 B2 * | 4/2020 | Pandey | ................. | H04L 9/0819 |
| 11,416,028 B1 * | 8/2022 | Kamepalli | ............ | G06F 1/3293 |
| 2009/0323573 A1 * | 12/2009 | He | ........................... | H04L 12/12 455/572 |
| 2013/0027413 A1 | 1/2013 | Jayavant et al. | | |
| 2013/0073878 A1 | 3/2013 | Jayasimha et al. | | |
| 2014/0126442 A1 | 5/2014 | Jafarian et al. | | |
| 2014/0365796 A1 | 12/2014 | Han et al. | | |
| 2016/0054786 A1 * | 2/2016 | Chenault | ............. | G06F 13/4022 710/313 |
| 2018/0232037 A1 * | 8/2018 | Darin | ..................... | G06F 3/0685 |
| 2019/0258309 A1 * | 8/2019 | Grobelny | ............ | G06F 11/3055 |
| 2020/0042070 A1 * | 2/2020 | Rodriguez Bravo | ........................ | H04W 52/0277 |
| 2020/0100269 A1 * | 3/2020 | Gulbay | ................. | G06F 1/3212 |
| 2020/0326767 A1 * | 10/2020 | Iyer | ...................... | G06F 1/1677 |

(Continued)

FOREIGN PATENT DOCUMENTS

KR   10-2014-0054071 A   5/2014

*Primary Examiner* — Mohammed H Rehman
(74) *Attorney, Agent, or Firm* — Volpe Koenig

(57) ABSTRACT

A method and apparatus for managing a controller includes indicating, by a processor of a first device, to the controller of a second device to enter a second power state from a first power state. The controller of the second device responds to the processor of the first device with a confirmation. The processor of the first device transmits a signal to the controller of the second device to enter the second power state. Upon receiving a wake event, the controller of the second device exits the second device from the second power state to the first power state.

20 Claims, 4 Drawing Sheets

(56) References Cited

U.S. PATENT DOCUMENTS

2022/0001835 A1* 1/2022 Kim .................. B60R 25/00
2022/0103397 A1* 3/2022 Fung ................ H04L 12/40045

* cited by examiner

METHOD AND APPARATUS FOR MANAGING A CONTROLLER IN A POWER DOWN STATE

BACKGROUND

During a power saving mode in a system on chip (SOC) computer system, it is possible that a device may wake the SOC out of the power saving mode. There are numerous external devices in communication with the SOC that include their own embedded controllers (ECs). If those ECs send a signal to the SOC, it could prematurely wake the SOC from the power saving state. On the other hand, the ECs need to be placed in the lower power state as well to maximize the platform level power savings.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for managing a controller in a power-down state is described. When a system on chip (SOC) enters a power-down state, it signals to embedded controllers (ECs) in devices connected to the SOC to enter the power-down state as well so as not to prematurely wake the SOC from the power-down state. Once the power-down state is exited, the ECs are revived.

For example, in an SOC computer system, in order to effect power savings, some areas associated with the SOC may be powered down for power savings. However, components such as an on-platform device (PLD) or BMC (baseboard management controller), or the like, may continue to be powered up. Accordingly, the ECs in those devices may remain active if not instructed otherwise. Although described in additional detail below, an SOC is a device where many components of an entire system are resident on a chip. For example, an SOC may include a processor, memory, storage, input and output drivers, and other components on a single chip A method for managing a controller includes indicating, by a processor of a first device, to the controller of a second device to enter a second power state from a first power state. The controller of the second device responds to the processor of the first device with a confirmation. The processor of the first device transmits a signal to the controller of the second device to enter the second power state. Upon receiving a wake event, the controller of the second device exits the second device from the second power state to the first power state.

A system for managing a controller includes a system on chip (SOC) processor and an embedded controller (EC) integrated on an external device to the SOC, the EC operatively coupled with and in communication with the SOC processor. The SOC processor indicates to the EC to enter a second power state for the external device from a first power state. The EC responds to the SOC processor with a confirmation. The SOC processor transmits a signal to the EC to enter the second power state, and upon receiving a wake event, the EC exits the second power state to the first power state.

A non-transitory computer-readable medium for managing a controller, the non-transitory computer-readable medium having instructions recorded thereon, that when executed by the processor, cause the processor to perform operations. The operations include indicating, by a processor of a first device, to the controller of a second device to enter a second power state from a first power state. The controller of the second device responds to the processor of the first device with a confirmation. The processor of the first device transmits a signal to the controller of the second device to enter the second power state. Upon receiving a wake event, the controller of the second device exits the second device from the second power state to the first power state.

Figure 1:
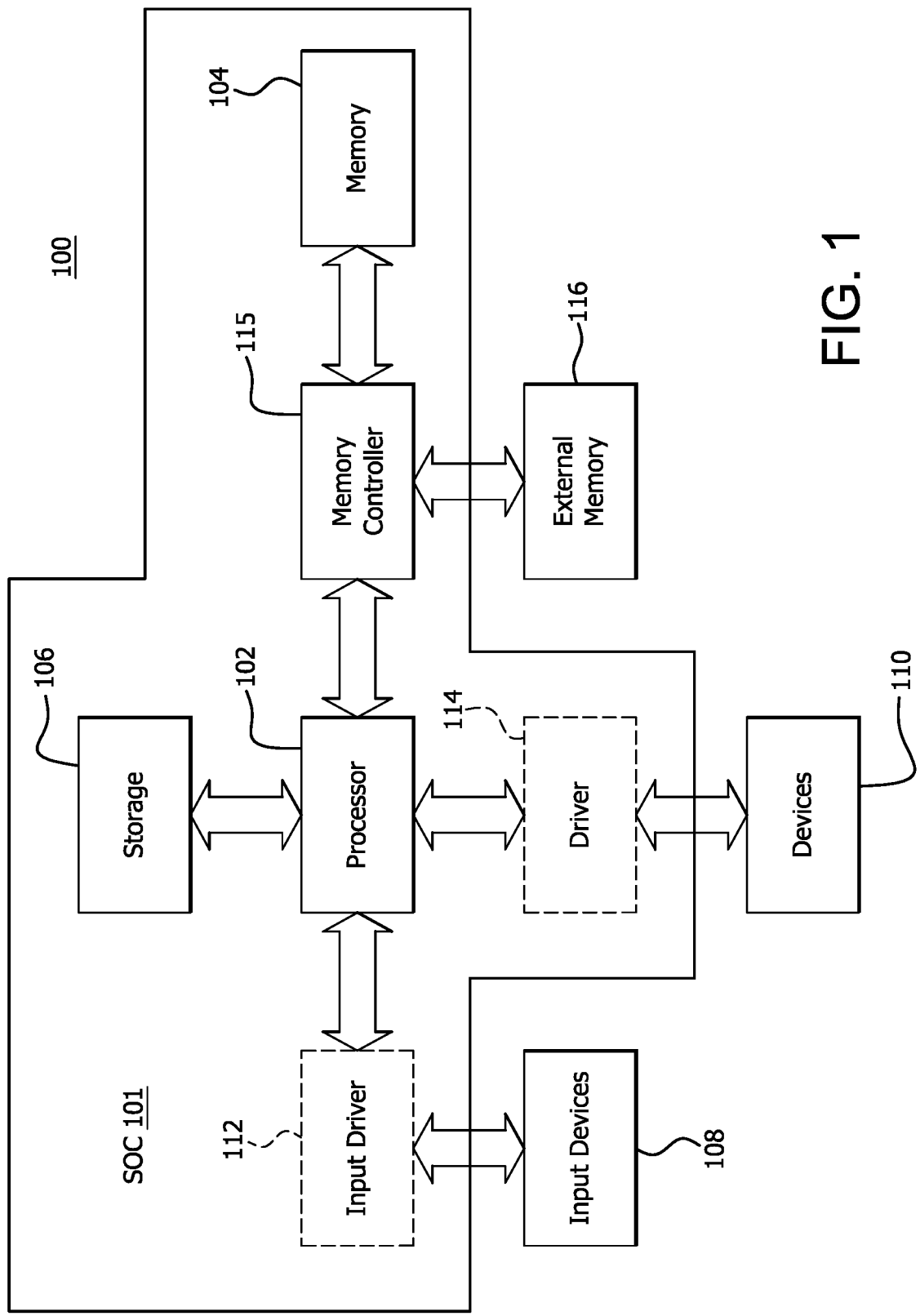
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a server, a gaming device, a handheld device, a set-top box, a television, a mobile phone, or a tablet computer. The device 100 includes a processor 102, a memory 104, a storage 106, one or more input devices 108, and one or more devices 110 that are in communication with the processor 102. For example, one or more devices 110 that control operations for the system, such as a battery controller or a thermal controller may be in communication with the processor 102. Also, the devices 110 may be output devices.

The device 100 can also optionally include an input driver 112 and a driver 114 if a device 110 requires a driver. Additionally, the device 100 includes a memory controller 115 that communicates with the processor 102 and the memory 104, and also can communicate with an external memory 116. In some embodiments, memory controller 115 will be included within processor 102. It is understood that the device 100 can include additional components not shown in FIG. 1.

As discussed above, the processor 102, memory 104, storage 106, input driver 112, output driver 114 and memory controller 115 may be included on an SOC 101.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the external memory 116.

Figure 2:
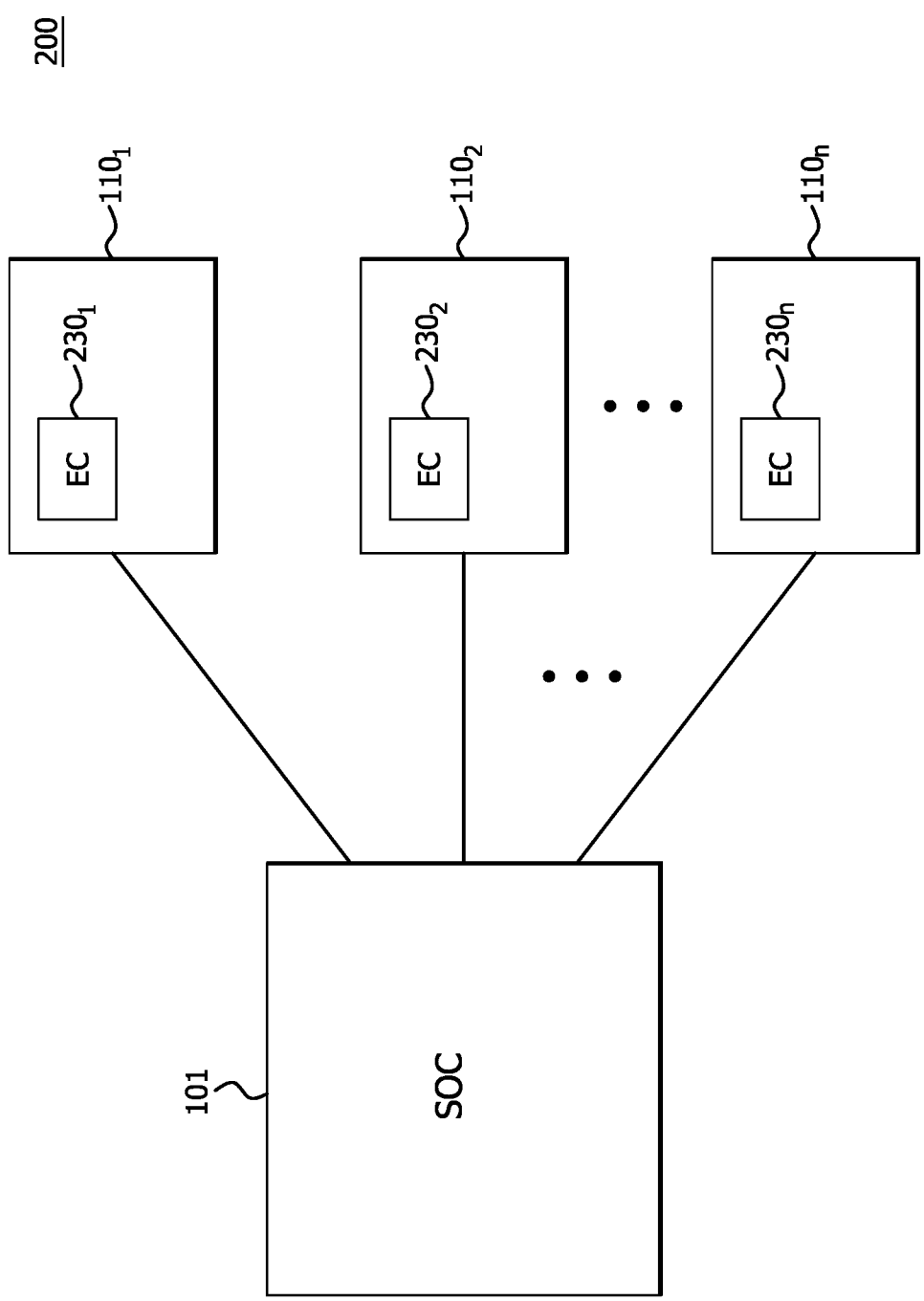
FIG. 2 is a block diagram of an example system in which one or more of the features of the disclosure can be implemented.

FIG. 2 is a block diagram of an example system 200 in which one or more of the features of the disclosure can be implemented. The example system 200 includes the SOC 101 in communication with a plurality of devices 110 (e.g., output devices 110 designated $110_1$-$110_n$). Each of the devices 110 includes an EC 230 (designated $230_1$-$230_n$) that controls the operation of the device. It should also be noted that ECs 230 may be associated with input devices 108 as well as the output devices 110.

Each of the ECs 230 is in communication with the SOC 101 (e.g., via the processor 102). The ECs 230 are, in some embodiments, microcontrollers that process information and execute operation for a device independent of the processor 102 and SOC 101. For example, an EC 230 may perform the function of processing signals to and from a keyboard, a touchpad, an onboard battery, and the like, as well as PCIe devices connected to the system 200.

By utilizing ECs, firmware can be updated for devices and the devices can be controlled without an operating system controlling it. This may free resources for the operating system and the SOC 101 to perform other tasks. Accordingly, the devices 110 controlled by ECs 230 operate independently of the SOC 101. For example, the devices 110 controlled by the ECs 230 may include ECs 230 for an on-platform device (PLD) or BMC (baseboard management controller). However, it should be noted that other devices 110 that include ECs may be connected to the SOC 101.

To guarantee both and SOC and EC components remain in the low power state uninterrupted for as long a time as possible, an SOC to EC protocol is utilized to conduct signaling. In fact, even when an EC is woken up and needs to wake up the SOC, an internal EC protocol allows for queuing more than single event before triggering the SOC wake-up.

Figure 3A:
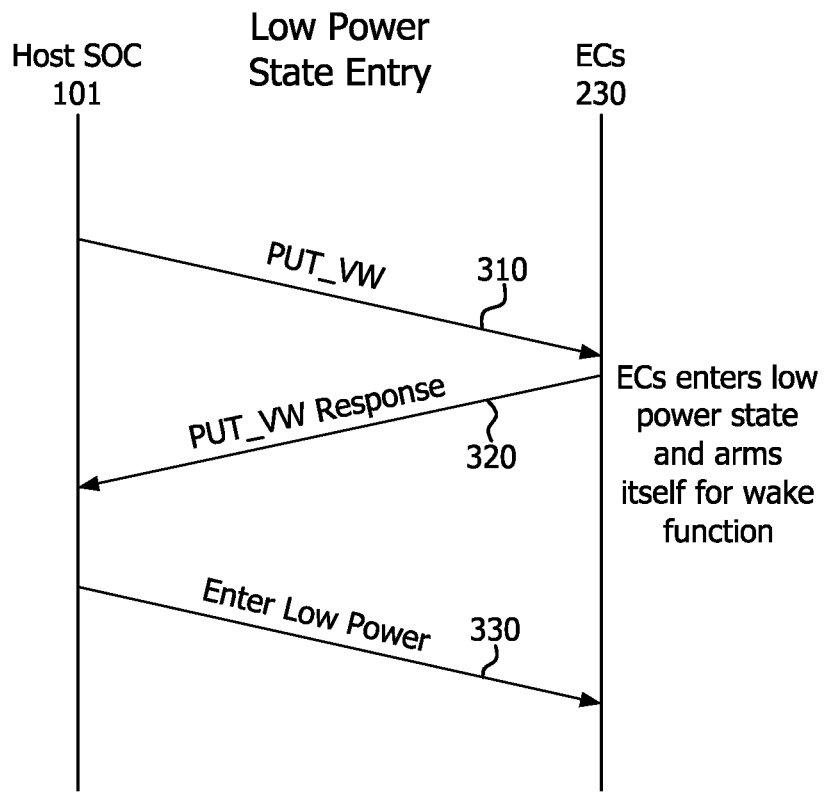
FIG. 3A is an example signal diagram of a system on chip (SOC) and embedded controllers (ECs) during a power saving entry mode.
Figure 3B:
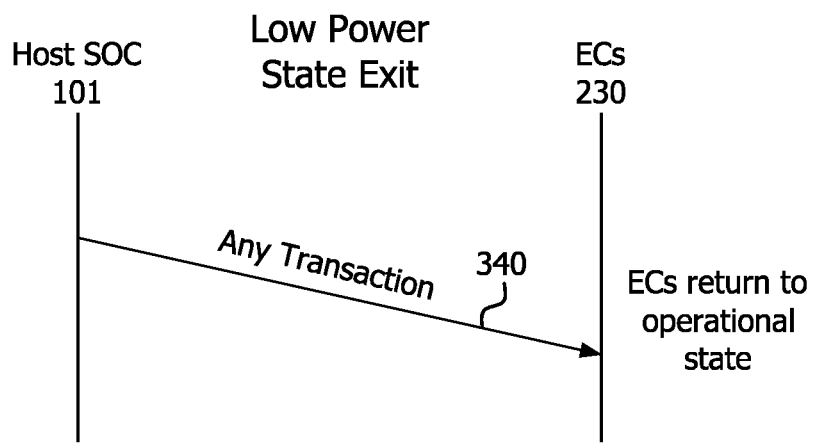
FIG. 3B is an example signal diagram of the SOC and ECs during a power saving exit mode.
Figure 4:
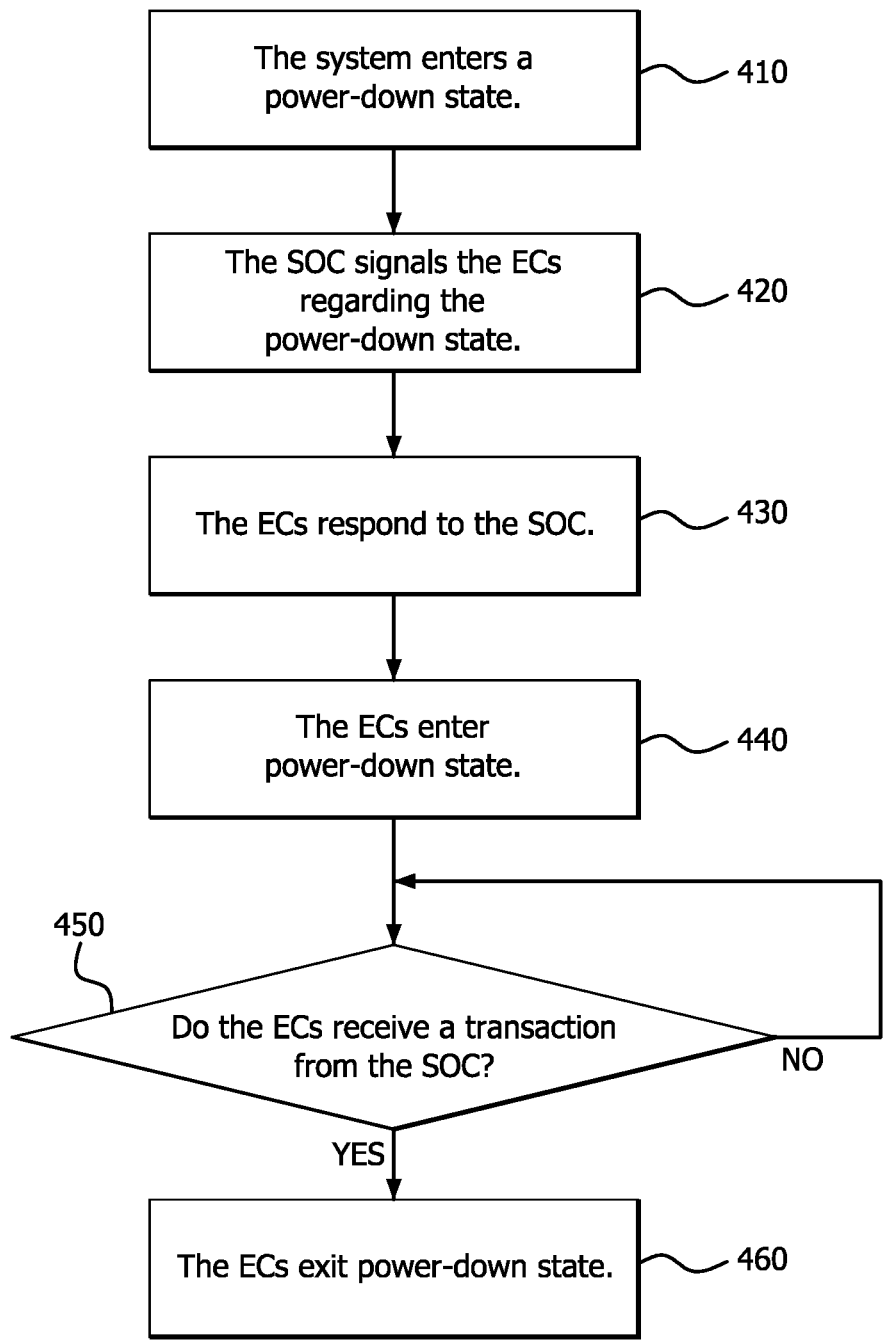
FIG. 4 is a flow diagram of an example method for managing a controller in a power-down state.

In order to depict the signaling between the SOC and the ECs with regard to managing the ECs, FIGS. 3A and 3B will now be referred to along with the method depicted in FIG. 4. FIG. 3A is an example signal diagram of an SOC and ECs during a power saving entry mode. FIG. 3B is an example signal diagram of the SOC and ECs during a power saving exit mode. FIG. 4 is a flow diagram of an example method 400 for managing a controller in a power-down state.

Referring now to FIG. 4 and referring back to FIGS. 3A and 3B where applicable, the system enters a power-down state, also referred to as a low power state (step 410). In step 420, the SOC signals the ECs regarding the power-down state.

For example, referring back to FIG. 3A, the SOC (Host) 101 transmits a first signal to the ECs 230 (e.g., a PUT_VW 310 signal). This signal 310 is transmitted to indicate to the ECs 110 that they are going to be instructed to enter a low power mode. By using an SOC, many functions can be combined into a single chip, resulting in cost savings and power savings due to powering a single chip. By utilizing ECs, additional processing functionality is moved to the local devices to control operation. Therefore, the ECs operate independently of the SOC, and therefore may not enter a low power mode unless instructed.

This signal 310 may be transmitted over a virtual wire, which is a logical connection between two endpoints. That is, rather than a physical wire connecting two devices (e.g., SOC 101 and ECs 230), a logical connection which may be routed through additional points exists. In a wired solution, a physical wire exists to transmit information between components. It should be noted that in other embodiments, a direct wire or firmware message can provide this indication.

In step 430 the ECs respond to the SOC. Again, referring back to FIG. 3A, the ECs 220 send a response signal (e.g., PUT_VW Response signal 320) to the SOC 101. This response signal 320 indicates that the ECs 230 have received the first signal 310 instructing them that they are to enter a low power mode.

Again, this response signal 320 may be transmitted over the same virtual wire that the first signal 310 is transmitted over. Alternatively, it may be transmitted over a different virtual wire or a physical wire.

After waiting a pre-defined period of time, the SOC 101 sends an enter low power signal 330 to the ECs to enter the low power mode. The enter low power mode signal 330 may also be transmitted over the same virtual wire that the first signal 310 and the response signal 320 are transmitted over. Alternatively, it may be transmitted over a different virtual wire or a physical wire. The ECs 230 then enter the power-down/low power state and arm themselves for a wake function (step 440).

In this manner, the ECs 230 enter a low power mode and then wait for a wake up message. The low power mode can be several levels of low power. For example, the low power mode could be a battery saving mode that is a maximum power saving mode or a lower power saving mode.

For example, the lower power savings mode is a power mode where the ECs operate with only an amount of power to achieve minimal functionality. In some embodiments, it may be power just to keep circuitry operating that may be utilized to wake once receiving a wake signal, discussed below. That is, some EC initiated operations can be fully disabled or their rate of use is substantially reduced when the SOC is in the power-down mode. For example, for an EC that controls a fan in the system, the polling of the thermal sensor, which provides information to that EC as to when to turn the fan on to cool the system may occur less frequently.

The SOC will be in the power-down mode for a period of time before needing to wake up. The period of time can be preconfigured or dynamically determined. For example, the period of time may before the SOC needs to wake up may depend on a hysteresis or event tracker.

In particular, one technique for waking up the SOC may be via a hysteresis or event tracker that is used to qualify the SOC for wake-up when the tracker exceeds some predefined values. The hysteresis defines how long every type of wake-up event is expected to wait before proceeding to wake up the SOC from the low power state Also, as mentioned, event may be tracked, such as battery power level, and if the event being tracked exceeds the predefined value (e.g., a battery level drops below a predefined value), a wake up is triggered.

Alternatively, the operation may be utilized in the opposite direction. That is, the SOC wakes up the EC after qualifying a need for the EC to be in operation. As indicated above, the determining whether the SOC to wake up the EC can be preconfigured or determined dynamically. In an example, one technique for waking up the EC may be via an event tracker. For example, an event tracker is set and the SOC wakes up the EC when the event tracker exceeds the predefined value.

For example, if an operation is required that the device controlled by the EC performs, the SOC may determine that the EC should be awakened and send a signal that will wake the EC. If the event tracker does not exceed the predefined value, the SOC can extend the EC low power state by tracking the wake-up events until the predefined value is exceeded.

If the ECs do not receive a transaction from the SOC (step 450), then they remain in the low power mode. If the ECs receive a transaction from the SOC (step 450), then the ECs exit the power-down state in step 460. Also, the ECs may exit the power power-down state if an event occurs such as a keyboard strike, a mouse touch, or the battery drain falls below a threshold amount.

For example, as mentioned above, if the SOC determines that an operation is needed from a device that an EC controls, the SOC will send a transaction signal discussed below, to that EC to wake.

Referring back to FIG. 3B, the SOC 210 sends any transaction signal 340 to the ECs 230 which cause them to return to the full operational state. That is, the ECs will wake from the low power state described above to a full operational an powered state.

In another embodiment, the ECs may wake up to the full operational state in a periodic manner based on the timer, and then be put back into the low power state if no activity requiring EC occurs.

For example, the SOC 210 may send a transaction signal that relates to an operation required to be executed by that EC 230. As mentioned above, the EC 230 may be resident on an on-platform device (PLD) or BMC (baseboard management controller) that is connected to the SOC to perform operations.

In accordance with the above description, external devices to the SOC that include embedded controllers are prevented from sending signals to the SOC, potentially prematurely waking the SOC and interfering with power savings. The ECs are also put into a power saving mode and armed for waking upon an event taking place. In one example, the event is any transaction that occurs from the SOC.

Additionally, although the examples described above discusses a single EC, there are other embodiments where an SOC can interact with more than one EC or with other on-platform devices (i.e., PLDs). For example, as described above, an SOC can interact with an EC that is utilized to control the temperature control of the system.

However, even where there may be more than single on-platform device, the protocol/handshake is identical to the one that is described in this application.

As discussed, the above description relates to when an SOC is entering a power-down state in order to effect power savings.

When the EC triggers the SOC wake-up, only a limited portion of the SOC may power up and the reason/need for a more extended wake-up is analyzed. This analysis may include accessing the EC internal log/status registers to understand the reason for the SOC wake-up.

For example, some areas of the SOC that are required for battery control or thermal control may wake up depending on the requirements. However, if the SOC determines that additional areas of the SOC are required to wake-up (e.g., a display region circuitry), based on, for example, a need to alert a user on the screen to an event, those areas may wake in addition.

In another example, based on this check, the extent of a further wake-up of the SOC is identified. For example, it may be analyzed whether the wake up and SOC to EC interaction needs to be limited to on-die IO domain microcontroller or CPU/GPU cores need to be woken up. As mentioned above, should the display be determined as necessary, the GPU cores may be woken up in order to execute any necessary graphics processing.

In another example, the EC trigger/interface is accounted for on the SOC entry into the low power state only. Once in the low power state, the SOC may ignore the trigger or wake-up events coming from the EC. That is, the SOC may determine that a wake-up is not necessary even though the EC attempts to trigger the wake-up. For example, the SOC may receive a trigger from the EC (e.g., a thermal sensor), but due to battery power determine to maintain the low power state to maintain power savings.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100. In addition, for example, the methods, or aspects thereof, described above may be performed by either a processor in the SOC or the EC.

What is claimed is:

1. A method for managing power consumption in a computer system, comprising:
    transmitting, by a processor of a first device, a first signal to a controller of a second device, wherein the first signal indicates a request for second device to enter a second power state from a first power state;
    receiving, by the processor of the first device, a confirmation from the controller of the second device in response to the first signal;
    transmitting, by the processor of the first device, a second signal to the controller of the second device to enter the second power state in response to the confirmation;
    entering, by the processor of the first device, the first device into a sleep mode;
    waking, by the processor of the first device, a portion of the first device from the sleep mode in response to receiving a wake event; and
    transmitting, by the processor of the first device, a wakeup signal to the controller of the second device in response to receiving the wake event and after queuing a plurality of events, wherein the wakeup signal causes the second device to transition from the second power state to the first power state.

2. The method of claim 1 further comprising receiving, by the processor of the first device, a third signal from the controller of the second device, the third signal confirming entry into the second power state.

3. The method of claim 1 wherein the second device enters the second power state upon receiving the second signal from the processor of the first device.

4. The method of claim 1, wherein the second device prepares for waking upon entering the second power state.

5. The method of claim 1 wherein the wakeup signal is a transaction signal.

6. The method of claim 1 wherein the second power state is a low power state.

7. The method of claim 1 wherein the first device is a system on chip (SOC) device and the controller of the second device is an embedded controller (EC) of a device external to the SOC device.

8. The method of claim 1 wherein the wakeup signal is transmitted to the controller of the second device using the portion of the first device.

9. The method of claim 1 wherein the portion of the first device is determined based on information stored in the second device.

10. The method of claim 1 wherein the processor of the first device enters the first device into the sleep mode in response to the second device entering the second power state.

11. A system for managing a controller, comprising:
    a system on chip (SOC) processor; and
    an interface that communicatively couples the SOC processor to an embedded controller (EC) integrated on an external device, wherein the external device is external to the SOC processor,
    wherein the SOC processor is configured to:
    transmit a first signal to the EC to enter a second power state for the external device from a first power state,
    receive a confirmation from the EC in response to the first signal,
    transmits a second signal to the EC to enter the second power state in response to the confirmation,
    enter the SOC processor into a sleep mode,
    wake a portion of the SOC processor from the sleep mode in response to receiving a wake event transmitted by the EC after queueing a plurality of events by the EC, and
    transmit a wakeup signal to the EC in response receiving the wake event, wherein the wakeup signal causes the EC to transition from the second power state to the first power state.

12. The system of claim 11 wherein the SOC processor further receives a third signal from the EC, the third signal confirming entry into the second power state.

13. The system of claim 11 wherein the external device enters the second power state upon receiving the second signal from the SOC processor.

14. The system of claim 11, wherein the external device prepares for waking upon entering the second power state.

15. The system of claim 11 wherein the wakeup signal is a transaction signal.

16. The system of claim 11 wherein the second power state is a low power state.

17. The system of claim 11 wherein the wakeup signal is transmitted to the controller of the EC using the portion of the SOC processor.

18. The system of claim 11 wherein the portion of the SOC processor is determined based on information stored in the EC.

19. A non-transitory computer-readable medium for managing a controller, the non-transitory computer-readable medium having instructions recorded thereon, that when executed by a processor of a first device, cause the processor to perform operations including:
    transmitting, by the processor of the first device, a first signal to a controller of a second device, wherein the first signal indicates a request for second device to enter a second power state from a first power state;
    receiving, by the processor of the first device, a confirmation from the controller of the second device in response to the first signal;
    transmitting, by the processor of the first device, a second signal to the controller of the second device to enter the second power state in response to the confirmation;
    entering, by the processor of the first device, the first device into a sleep mode;
    waking, by the processor of the first device, a portion of the first device from the sleep mode; and
    transmitting, by the processor of the first device, a wakeup signal to the controller of the second device in response to receiving a wake event and after queuing a plurality of events, wherein the wakeup signal causes the second device to transition from the second power state to the first power state.

20. The non-transitory computer-readable medium of claim 19 wherein the wakeup signal is transmitted to the controller of the second device using the portion of the first device.

* * * * *